US005866999A

United States Patent [19]

Schmelzer et al.

[11] Patent Number: 5,866,999

[45] Date of Patent: Feb. 2, 1999

[54] POSITION SWITCH SETTING MECHANISM

[75] Inventors: Lynn A. Schmelzer, Princeton; Dan E. Bollengier, Peru; Mark A. Des Rocher, Ladd, all of Ill.

[73] Assignee: Schlage Lock Company, San Francisco, Calif.

[21] Appl. No.: 975,270

[22] Filed: Nov. 21, 1997

Related U.S. Application Data

[63] Continuation of Ser. No. 685,869, Jul. 24, 1996, abandoned, which is a continuation of Ser. No. 368,504, Jan. 3, 1995, abandoned.

[51] Int. Cl.[6] .......... H02P 1/00

[52] U.S. Cl. .......... 318/286; 318/466; 49/18; 70/264

[58] Field of Search .......... 318/261, 266, 318/603, 281, 285, 286, 282, 626, 467, 466; 49/15–18, 199, 70, 360; 70/264, 143, 263; 340/274 R, 224, 541, 276, 293, 404, 825.37

[56] References Cited

U.S. PATENT DOCUMENTS

| | | | |
|---|---|---|---|
| 3,636,546 | 1/1972 | Iomonaco | 340/293 |
| 4,090,182 | 5/1978 | Young | 340/274 R |
| 4,498,033 | 2/1985 | Aihara et al. | 318/261 |
| 4,563,625 | 1/1986 | Kornbrekke et al. | 318/603 |
| 4,929,877 | 5/1990 | Clark et al. | 318/468 |
| 4,962,473 | 10/1990 | Crain | 364/900 |
| 5,003,800 | 4/1991 | Bublewicz | 70/264 |
| 5,278,480 | 1/1994 | Murray | 318/626 |
| 5,282,337 | 2/1994 | Duhame et al. | 49/199 |
| 5,285,136 | 2/1994 | Duhame | 318/266 |
| 5,350,986 | 9/1994 | Long et al. | 318/432 |
| 5,982,528 | 1/1991 | Michel | 49/16 |

*Primary Examiner*—John W. Cabeca
*Attorney, Agent, or Firm*—Robert F. Palermo; Michael H. Minns

[57] ABSTRACT

A set/operate mode switch is interposed between the door sensing or element door position activated switch and a remote monitoring station, to enable the remote station to monitor the door condition, or to enable a local signal assembly to monitor the door condition. The local signal assembly is made operative by the set/operate switch, so that the sensing element can be accurately set before turning door monitoring over to the remote station. While the local signal assembly is verifying the door condition, a shunt or shorting element keeps the remote monitoring station displaying a door open condition, all the while that the local signal assembly is operatively engaged, for security reasons. Only when the local signal assembly is isolated from the arrangement, can the remote monitoring station give a true signal of the door condition.

12 Claims, 3 Drawing Sheets

POSITION SWITCH SETTING MECHANISM

This application is a continuation of application Ser. No. 08/685,869, filed Jul. 24, 1996 which is a continuation of prior application Ser. No. 08/368,504 filed Jan. 3, 1995 both now abandoned.

BACKGROUND OF THE INVENTION

There are applications, especially in penal institutions, in which a door closure will have a sensing element, or door position activated switch, which can track the door condition: open or closed, and report the condition to a remote monitoring station for security reasons. At the remote monitoring station, the reported condition is signalled either audibly or optically. Such a sensing or door position activated switch is disclosed in U.S. Pat. No. 4,835,905.

Known products which have this feature can be compromised. The wires and connectors used to report the door condition can be connected improperly, by inadvertence or design, to report a door closed condition to the remote monitoring station when, in fact, the door is not closed, is not secured. To overcome this problem, it is conceivable to use two, separate switches. One would report to the remote station, and the other would report to wires at the door. However, in practice, it is extremely difficult or impossible to have the two switches aligned accurately enough to be used.

What has been long needed is a single controlling switch, used in combination with the sensing or door position activated switch, which can be operated to report the door condition to the remote station, while isolating a local signal assembly at the door, and can be operated to report the door condition, accurately, to such a local signal assembly, at the door. Ideally, operation of such a controlling switch would maintain a door-open signal, at the remote station, all the while that the local signal assembly is being operated to set or establish the correct functioning of the door sensing element in the door closure.

SUMMARY OF THE INVENTION

It is a purpose of this invention to set forth, in combination with a door closer, a door-monitoring system, comprising a door position-activated switch within the door closer; and a remote, door-monitoring station; wherein said station has means operable (a) for indicating a door-open condition, and (b) for indicating a door-closed condition; and a control means, interconnecting said switch and said station, for enabling operation of said indicating means; wherein said control means is operative in a first mode to cause said station to indicate either one of said conditions, and operable in a second mode of operation to cause said station to indicate only one of said conditions.

Further purposes of this invention will become apparent by reference to the following drawings.

DESCRIPTION OF THE PREFERRED EMBODIMENT

Figure 1:
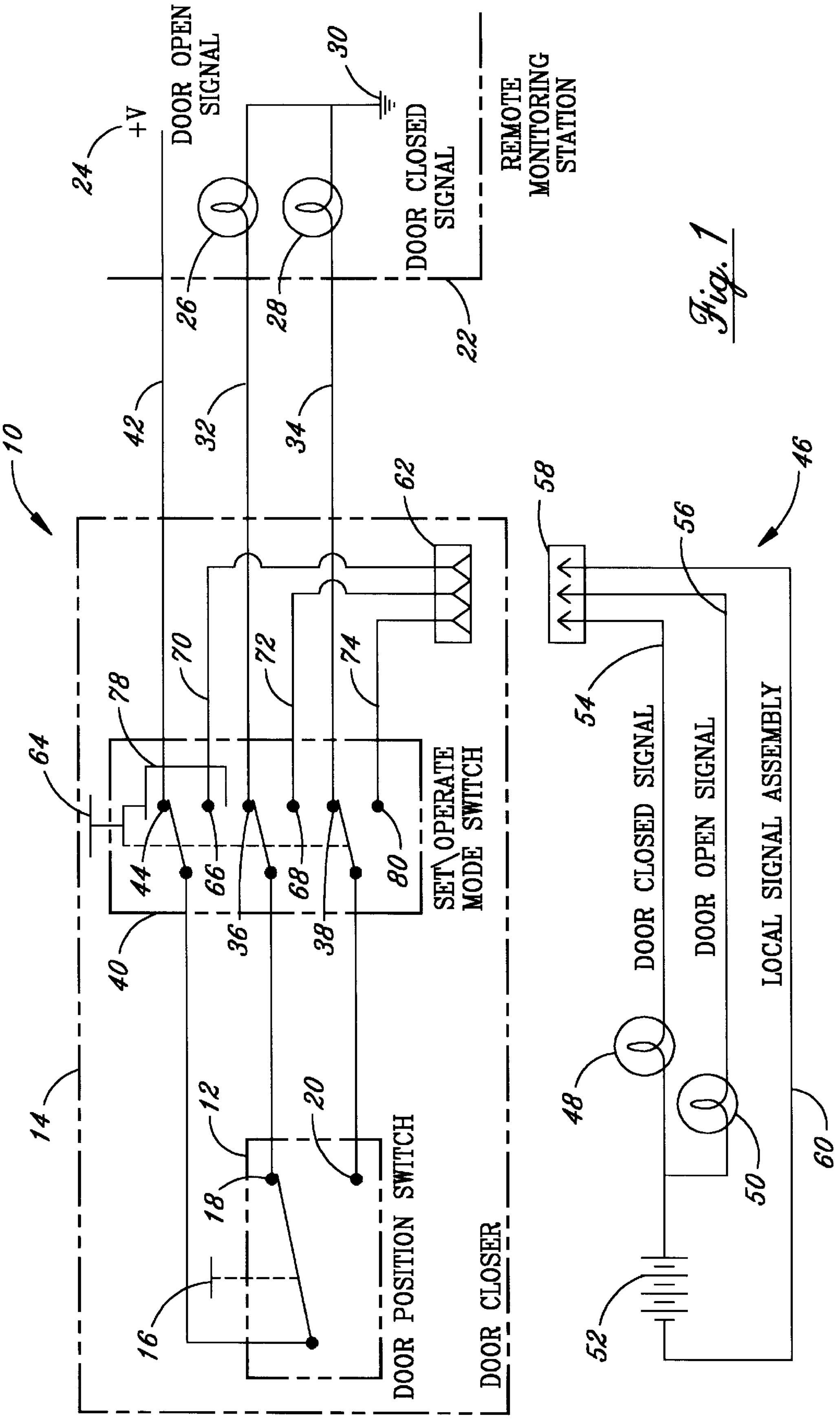
FIG. 1 is a schematic diagram of the novel door-monitoring system, according to an embodiment thereof, in which the local signal assembly is operatively isolated, and the remote monitoring station is monitoring the door position.

As shown in FIG. 1, the novel door-monitoring system 10 comprises a door sensing element or door position activated switch 12, the same being confined within a door closer 14. Sensing element 12 comprises that which is disclosed in U.S. Pat. No. 4,835,905; it is a single pole, double throw switch having an actuator 16 which tracks the door condition whereby to establish an electrical connection through terminal 18 or terminal 20. The system 10 has a remote monitoring station 22 at which are a source 24 of electrical power, a door-open signal lamp 26, a door-closed signal lamp 28 and a ground 30. The lamps 26 and 28 are electrically connected to the ground 30, at one end and have leads 32 and and 34, extending from the opposite ends, to terminals 36 and 38, respectively, of a three-pole, double throw, control switch, or set/operate mode switch 40. A lead 42 connects the source 24 to a terminal 44 of the switch 40. As shown, switch 40 establishes continuity between source 24 and lamp 26, via lead 42, terminal 44, terminal 18, terminal 36, and lead 32. Consequently, presumably the door (not shown) being monitored by system 10 will signal a door open condition at the remote station 22.

The system 10 comprises a local signal assembly 46 which is used for setting the door sensing element or door position activated switch 12, accurately, in relation to the actual condition of the door. Assembly 46 comprises another door closed lamp 48 and another door open lamp 50, the two being connected at one side to a further electrical power source 52. Leads 54 and 56 connect the other sides of the lamps 48 and 50 to a connector 58. Finally, a lead 60 connects the power source 52 to the connector 58 as well. As shown, the local signal assembly 46 is isolated from the closer 14 and remote monitoring station 22. However, to put it in operation, the connector 58 is set into a three-terminal socket 62 which, like switches 12 and 40, is confined within the closer 14.

Figure 2:
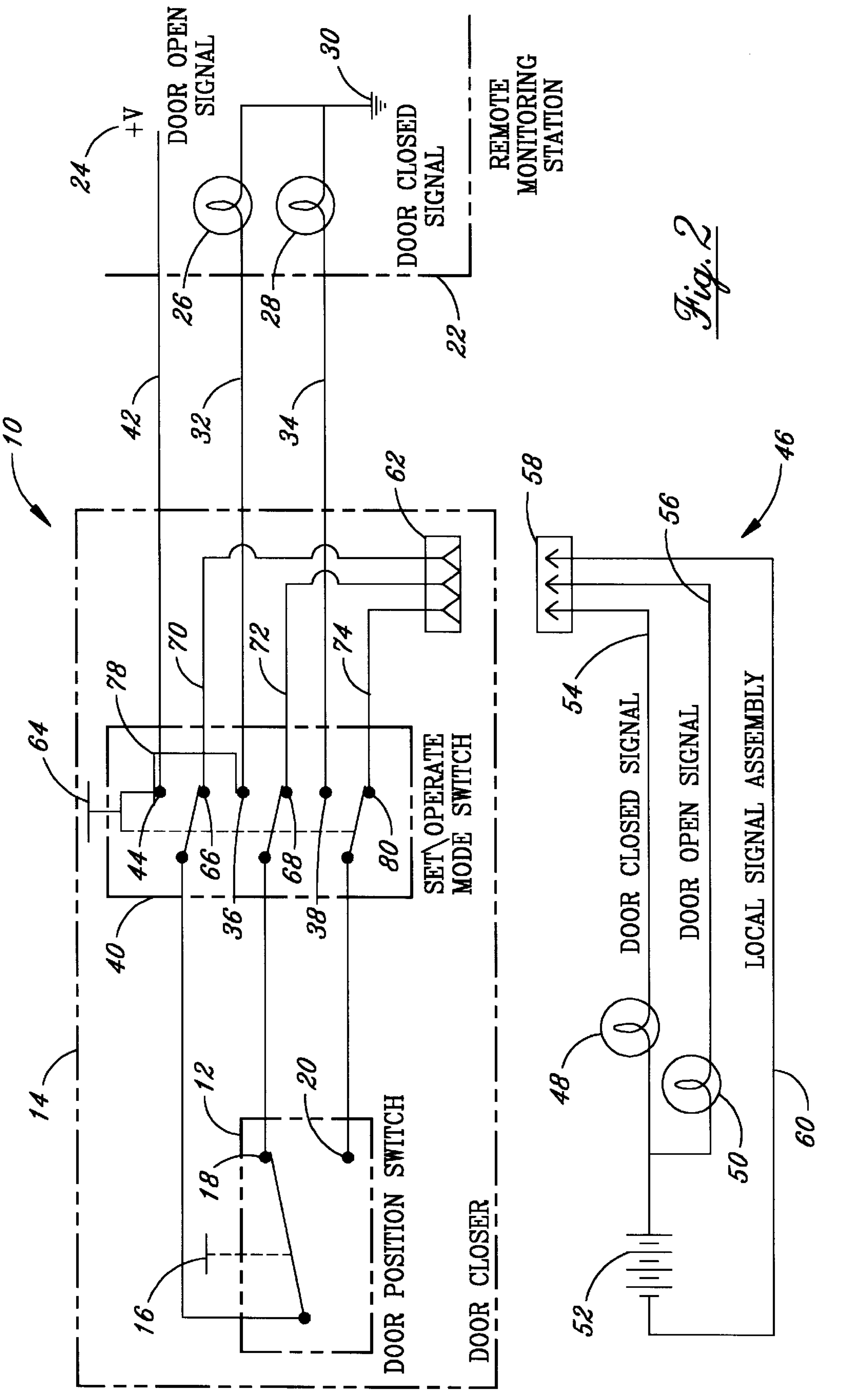
FIG. 2 is a schematic diagram, like that of FIG. 1 in which, however, the local signal assembly is operative, and indicates the condition of the door, the latter being in an open status; too, the remote monitoring station indicates a door open condition.

Switch 40 has an actuator 64. By depressing the actuator 64 the switch 40 moves the connections of sensing element 12 from terminals 44, 36, 38 to terminals 66, 68, and 80 of switch or set/operate mode switch 40. As a consequence thereof, as shown in FIG. 2, the local signal assembly 46 monitors the door condition. Terminals 66, 68 and 80, of switch 40, have leads 70, 72 and 74 coupled thereto which connect with the terminals of the socket 62. Albeit spaced apart in FIG. 2, it is to be assumed that connector 58 is engaged with socket 62.

Figure 3:
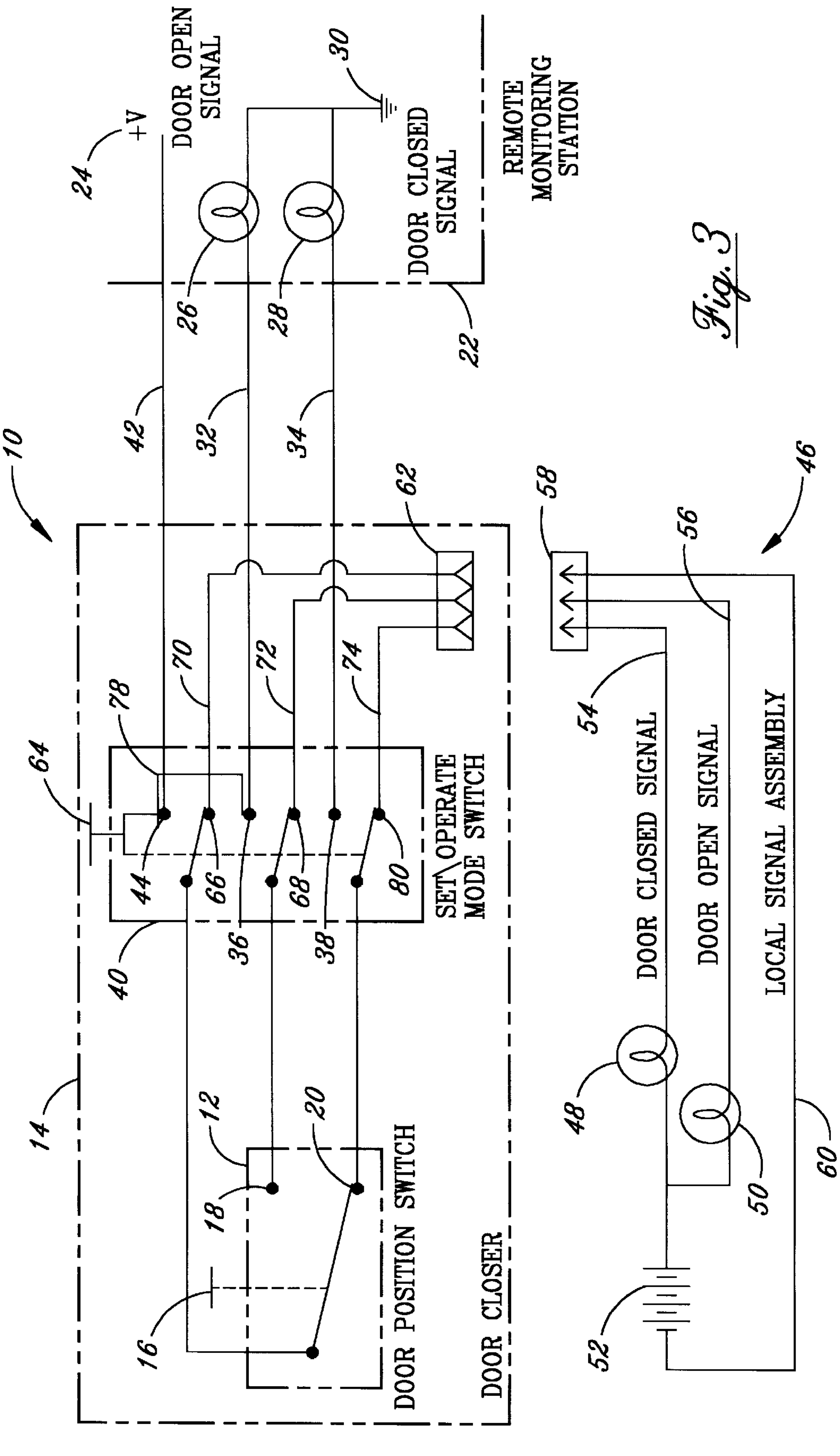
FIG. 3 is another schematic diagram in which the door is closed, and this condition is verified by the local signal assembly, whereas the remote monitoring station continues to indicate a door open condition.

With the door in an open condition, its position is signalled by lamp 50 via lead 56 to connector 58, lead 72, terminal 68, terminal 18, terminal 66, lead 70, lead 60 and source 52. If the door is closed, and the door sensing or door element 12 is set to track this condition, then it will disengage from terminal 18 and make contact with terminal 20 thereof. Now, as shown in FIG. 3, the door closed signal lamp 48 will illuminate. Its continuity is established by lead 54 through to lead 74, terminal 80, terminal 20, terminal 66, lead 70, lead 60 and source 52. Now, notwithstanding the fact that the door is closed, the remote monitoring station continues to display a door open signal, as explained in the ensuing text.

For the purposes of security, especially if the system 10 is used in a penal institution, it is deemed critical to keep a door-open signal displayed at the remote monitoring station, unless and until a proper setting of the door sensing element or door position activated switch 12 is accurately made to track the condition of the door correctly. This is why, even though the door closed condition is presumably established, the remote monitoring station 22 continues to display the door open status.

Actuator 64 has a shunting or shorting element 78 integral therewith. Upon the actuator 64 being depressed, the element 78 establishes continuity between terminals 44 and 36, and this connects the source 24 with the door open lamp 26 via leads 42 and 32. Element 78 translates in switch 40 to contact both terminals 44 and 66.

When the door sensing element or door position switch has been properly set to track the true door condition, then the local signal assembly 46 can be isolated again. In this, the actuator 64 is extracted, i.e., moved upwards (as shown in the figures) to remove contact of the element 78 from the terminals 44 and 36, and to connect the poles of the switch 40 to terminals 44, 36 and a terminal 38. Terminal 38 is coupled to line 34 from the door closed lamp 28. Consequently, with the local signal assembly 46 isolated, now, from the element 12, switch 40 and the station 22, the station 22 will monitor the door status, independently and accurately.

While I have described my invention in connection with a specific embodiment thereof, it is to be clearly understood that this is done only by way of example, and not as a limitation to the scope of the invention, as set forth in the purpose thereof and in the appended claims.

I claim:

1. In combination with a door closer, a door-monitoring system, comprising:

a door position activated switch within the door closer for sensing an open and a closed position of a door;

a remote, door-monitoring station, said station having means for indicating a door-open condition, and means for indicating a door-closed condition; and a control means having a first mode for electrically interconnecting said door position activated switch and said indicating means wherein said indicating means are responsive to said door position activated switch and having a second mode for disconnecting said door position activated switch from said indicating means and for causing said means for indicating a door-open condition to indicate a door-open condition regardless of the position of the door.

2. A door-monitoring system according to claim 1, wherein said remote, door-monitoring station comprises a source of electrical power, a first, electrically-operative, door-open signaling element, a second electrically-operative, door-closed signaling element, and an electrical ground connected to said first and second signaling elements; and said control means comprises means for effecting electrical continuity between said electrical power source and either one of said first and second signaling elements, in said first mode of operation, and between said source and only said first door-open signaling element, in said second mode of operation.

3. A door-monitoring system, according to claim 2, wherein said position activated switch comprises a single pole, double throw switch; and said control means comprises a multiple pole, double throw switch.

4. A door-monitoring system, according to claim 3, wherein said multiple pole, double throw switch further comprises means for shorting across a pair of switch terminals.

5. A door-monitoring system, according to claim 2, further comprising:

a local signal assembly comprising a second source of electrical power, a third, electrically-operative, door-open signaling element, a fourth, electrically operative, door-closed signaling element, a three-terminal connector plug, and leads individually connecting said second source of electrical power and said third and fourth signaling elements to said connector plug; and said control means comprises means for interconnecting said connector plug and said control means.

6. A door-monitoring system, according to claim 5, wherein said means for interconnecting comprises a three-terminal socket.

7. A door-monitoring system, according to claim 5, wherein said control means comprises means, cooperative with said position actuated switch, for effecting electrical continuity between said second source of electrical power and either one of said third electrically-operative door-open signaling element and fourth electrically operative door-closed signaling element.

8. A door-monitoring system, according to claim 4, wherein said multiple pole, double throw switch has an actuator to which said shorting means is operatively coupled.

9. A door-monitoring system, according to claim 8, wherein said shorting means comprises means for effecting continuity between said source of electrical power and said first door-open signaling element.

10. In combination with a door closer, a door monitoring system comprising:

a position activated switch disposed within the door closer for producing a first signal at a first terminal indicating a door is closed and a second signal at a second terminal indicating the door is not closed;

a remote monitoring station having first means for signaling that the door is closed and a second means for signaling that the door is not closed;

an electrical power source; and, circuit means for selectively connecting said power source to said first means and said second means, said circuit means including a mode switch disposed within the door closer, said mode switch having a first state and a second state, said circuit means connecting said power source to a third terminal of said position activated switch and said first and second terminals to said first and second means when said mode switch is in said first state, and connecting said power source to said second means when said mode switch is in said second state, wherein regardless of the position of the door, said second means signals that said door is open when the mode switch is in its second state.

11. A door monitoring system as claimed in claim 10 in combination with a local signal assembly for use at the door in accurately setting said position activated switch in relation to the actual condition of the door, said local signal assembly comprising: a third means for signaling that the door is closed; a fourth means for signaling that the door is open; and a first connector plug connected to said third means and said fourth means;

a second connector plug disposed within said door closer for mating with said first connector plug, said second connector plug being connected to said mode switch;

said mode switch, in said second state, connecting the first and second terminals of the position activated switch to said third and fourth means, respectively, when the first and second connector plugs are mated.

12. A door monitoring system as claimed in claim 11 further comprising:

a second electrical power source in said local signal assembly, said second electrical power source being connected to said third means, said fourth means and said first connector plug, said mode switch, in said second state, connecting said second electrical power source to said third terminal of said position activated switch.

* * * * *